United States Patent
Meier et al.

(10) Patent No.: US 11,248,643 B2
(45) Date of Patent: Feb. 15, 2022

(54) COMPOSITE ELEMENT FOR BUILDING CONSTRUCTION AND CIVIL ENGINEERING, AND USE OF A FASTENING ELEMENT DESIGNED AS A CLAMPING ELEMENT

(71) Applicant: ACO SEVERIN AHLMANN GMBH & CO KOMMANDITGESELLSCHAFT, Budelsdorf (DE)

(72) Inventors: Stephan Meier, Albersdorf (DE); Christian Philip Schumann-Hammermann, Kiel (DE)

(73) Assignee: ACO SEVERIN AHLMANN GMBH & CO. KOMMANDITGESELLSCHAAFT, Budelsdorf (DE)

( * ) Notice: Subject to any disclaimer, the term of this patent is extended or adjusted under 35 U.S.C. 154(b) by 0 days.

(21) Appl. No.: 16/762,311

(22) PCT Filed: Nov. 13, 2018

(86) PCT No.: PCT/EP2018/081064
§ 371 (c)(1),
(2) Date: May 7, 2020

(87) PCT Pub. No.: WO2019/096779
PCT Pub. Date: May 23, 2019

(65) Prior Publication Data
US 2020/0291641 A1 Sep. 17, 2020

(30) Foreign Application Priority Data
Nov. 17, 2017 (DE) .................... 10 2017 127 185.6

(51) Int. Cl.
*F16B 21/18* (2006.01)
*F16B 9/00* (2006.01)

(52) U.S. Cl.
CPC ............ *F16B 21/186* (2013.01); *F16B 9/056* (2018.08)

(58) Field of Classification Search
CPC .. F16B 2/245; F16B 9/07; F16B 9/023; F16B 9/052; F16B 9/056; F16B 21/18;
(Continued)

(56) References Cited

U.S. PATENT DOCUMENTS 2,140,441 A * 12/1938 Clark ..................... F16B 9/056
248/27.3
2,141,878 A * 12/1938 Roby ..................... F16B 9/023
248/56
(Continued)

FOREIGN PATENT DOCUMENTS

| CN | 1148653 A | 4/1997 |
| CN | 203546753 U | 4/2014 |

(Continued)

OTHER PUBLICATIONS

International Search Report for PCT/EP2018/081064 (5 pages). (Year: 2019).*
(Continued)

*Primary Examiner* — Josh Skroupa
(74) *Attorney, Agent, or Firm* — Pearne & Gordon LLP

(57) ABSTRACT

A composite element (10) for use in construction, in particular building construction or civil engineering, which composite element comprises at least two components and at least one fastening element (11) for connecting the components. A first component has at least one assembly pin (13), which is cylindrical in particular. The fastening element (11) is configured as a clamping element such that it can be (Continued)

Figure 1:
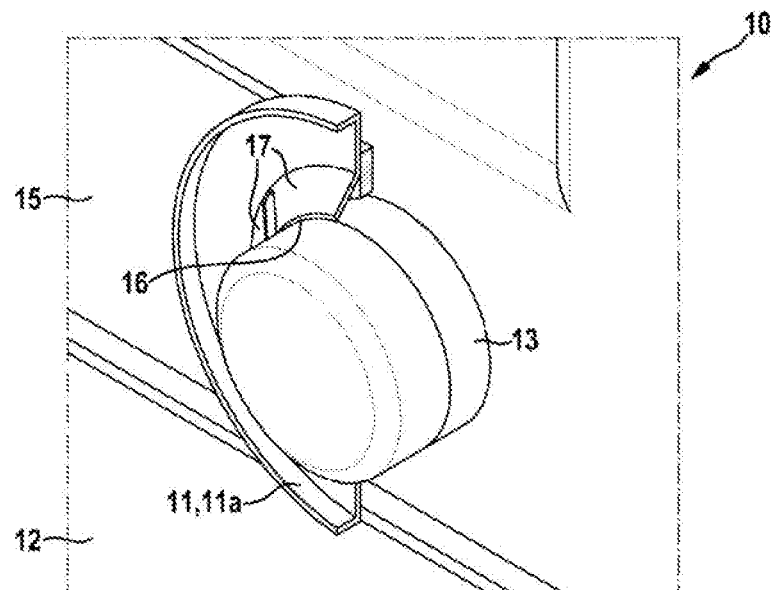

force-fittingly connected to the assembly pin (13). The invention further relates to a use of a fastening element (11) configured as a clamping element.

7 Claims, 1 Drawing Sheet

(58) Field of Classification Search
CPC ............. F16B 21/186; Y10T 403/4628; Y10T 403/4694; Y10T 403/581; Y10T 403/587
USPC .................................. 403/240, 263, 316, 319
See application file for complete search history.

(56) References Cited

U.S. PATENT DOCUMENTS

| | | | |
|---|---|---|---|
| 2,321,157 A * | 6/1943 | Rees ...................... | F16B 21/20 411/521 |
| 3,916,756 A | 11/1975 | Yoda | |
| 5,195,860 A * | 3/1993 | Steyn ...................... | F16B 21/20 411/353 |
| 5,833,422 A * | 11/1998 | Haga ...................... | F16B 21/20 411/526 |
| 6,278,061 B1 * | 8/2001 | Daoud .................... | H02G 3/22 16/2.1 |
| 6,781,088 B2 * | 8/2004 | Grubb ...................... | F16B 9/01 219/121.64 |
| 7,963,011 B2 * | 6/2011 | Lottini .................. | F16B 5/0664 24/683 |
| 7,963,498 B2 * | 6/2011 | Seymour ............... | H01R 13/74 248/604 |
| 9,695,960 B2 * | 7/2017 | Larsson ............... | F16L 37/0985 |
| 10,060,183 B2 * | 8/2018 | Dintheer ................. | F16B 2/243 |
| 10,549,703 B2 * | 2/2020 | Korber .................... | F16B 2/245 |
| 2008/0178437 A1 | 7/2008 | Lottini et al. | |
| 2009/0194990 A1 * | 8/2009 | Williams ................ | F16L 19/08 285/23 |
| 2012/0192379 A1 * | 8/2012 | Amirian .................. | F16B 9/023 16/2.5 |

FOREIGN PATENT DOCUMENTS

| | | | | |
|---|---|---|---|---|
| DE | 19961709 A1 * | 7/2001 | ............ | F16B 21/186 |
| DE | 102004003251 A1 * | 8/2005 | ............ | F16B 21/186 |
| DE | 102006060883 A1 * | 6/2008 | ............ | F16C 19/184 |
| EP | 0908573 A2 | 4/1999 | | |
| FR | 2203405 A5 | 5/1974 | | |
| RU | 20140136359 A | 3/2016 | | |
| WO | 0155527 A1 | 8/2001 | | |

OTHER PUBLICATIONS

Palmese, et al. Environmental durability of polymer concrete. Dec. 31, 1996. Abstract. Found at URL: <https://www.osti.gov/biblio/412101-environmental-durability-polymer-concrete>.*
An Office Action issued in corresponding Chinese Patent Application No. 201880074309.1; dated Dec. 21, 2021.
An Office Action issued in corresponding Russian Patent Application No. 2020119273; dated Dec. 2, 2020.
An Office Action issued in corresponding Australian Patent Application No. 2018369563; Dated: Jun. 3, 2021.
An Office Action issued in corresponding Chinese Patent Application No. 201880074309.1; Dated: Jun. 21, 2021.

* cited by examiner

COMPOSITE ELEMENT FOR BUILDING CONSTRUCTION AND CIVIL ENGINEERING, AND USE OF A FASTENING ELEMENT DESIGNED AS A CLAMPING ELEMENT

The invention relates to a composite element for building construction or civil engineering. The invention further relates to the use of a fastening element configured as a clamping element.

The object of the invention is to provide a composite element for use in building construction or civil engineering, with which a stable connection between industry-typical components can be achieved with little effort. The object of the invention is further to specify a use of a fastening element configured as a clamping element.

This object is achieved according to the invention by a composite element having the features of claim 1. In terms of the use, the object is achieved by the subject matter of claim 9.

The invention is based on the idea of specifying a composite element for building construction or for civil engineering that comprises at least two components and at least one fastening element for connecting the components. A first component has at least one assembly pin, which in particular is cylindrical. The fastening element is configured as a clamping element, such that it can be force-fittingly connected to the assembly pin.

Within the scope of the application, conceivable uses for the composite element according to the invention are preferably found in the fields of light well mounting, fasteners for light well fixtures, locking elements, fasteners for seals or damping elements in light wells or drainage devices, processes for joining drainage devices, fasteners for drainage channels, connectors for frames, for example for landscape drains, shoe scrapers, or channels, or in traps and shafts.

The invention has the advantage that the clamping connection of the clamping element enables the cost-effective production and simple adjustability of the composite element. Two or more components that are typical for the relevant industry can thus be connected to one another very easily, for example as compared with welding or casting. Complex mold construction and time-consuming production processes can therefore be dispensed with. The clamping element produces a force-fitting connection that reliably prevents any undesired mobility or displacement of the components relative to one another; at the same time, the clamping element can be mounted flexibly at any point on the component.

Further preferred embodiments of the invention are specified in the dependent claims.

In a particularly preferred embodiment, the fastening element is configured as a clamping disk, in particular as an axial clamping ring, which has a central recess for receiving the assembly pin, and which has a plurality of clamping claws, the clamping claws being at an angle to a plane of the clamping disk when the fastening element is mounted on the assembly pin. This ensures an anchoring or a non-detachable clamping. In general, the number, arrangement, and geometry of the individual clamping claws of the clamping disk or the clamping element may vary. Axial clamping rings in particular have a constant clamping effect with strong holding forces, while at the same time being easy to install. Once it has been mounted, the clamping disk is advantageously non-detachably connected to the components, since the connection can be released only by deformation.

A geometry of the fastening element is preferably adapted to an associated geometry of the assembly pin. In particular, the fastening element may have round, oval, or claw-like geometries.

Advantageously, a first component features a polymer concrete and a second component features a metal, in particular steel or cast iron. Other materials are also generally conceivable, such as plastic or cement concrete, metals, cast materials, etc. Combinations of different materials, such as concrete/polymer concrete, metal/plastic, plastic/concrete, etc., are also conceivable.

The clamping element can be affixed to end walls of drainage channels, for example. In particular, an end wall of the channel may be formed from polymer concrete as the first component. In that case, the end wall has a plurality of assembly pins, or cylindrical protrusions. The assembly pins correspond in terms of their geometric shape to the clamping elements, in particular the clamping rings. The clamping elements can be used to fasten the second component, preferably in the form of brackets, in particular steel brackets, to the end wall. This enables a simple and quick connection to be produced between the components. Advantageously, an additional labor-intensive gluing step or other type of connection can be dispensed with. For a secure connection, multiple clamping elements for multiple brackets can preferably be used.

In a further embodiment, a first component is configured as a channel body and a second component is configured as a cover or frame for a drainage device. The fastening element can further be used to connect a frame of a drainage channel to a grate.

In a further embodiment, a first component is configured as a light well body and a second component is configured as a cover or frame for a light well.

The fastening element can preferably be integrated into at least one component. The functioning principle of the clamping elements can then be transferred to one or more of the components to be connected. In that case it is possible, for example, to deviate from a cylindrical shape of the associated assembly pin. Integrating the functioning principle advantageously reduces the total number of components that are required. In particular, the integration of the functioning principle can be transferred to a large number of components typical for the industry, including, for example, plastic bars on a cast iron grate or metal and metal.

In a particularly preferred embodiment, the fastening element is positioned on the components in such a way that a seal applied to a first component, in particular made of an elastic material, can be fixed. The first component may comprise an end wall of a polymer concrete channel, for example. A steel bracket can be attached to the end wall and can be connected to the end wall by means of a fastening element configured as a clamping element. A seal can preferably be applied to an opposite side of the end wall. The seal features an elastic material, in particular foam rubber or EPDM foam. In other words, the seal forms a coating on the opposite side of the end wall. The bracket and the seal can be used to ensure that the end wall can be connected, for example, in a fluid-tight manner, to an adjoining drainage channel. Advantageously, the seal can also be securely fixed by means of the bracket via the clamping element. An additional process of gluing the seal on the opposite side of the end wall can thus be dispensed with. Particularly advantageously, the seal on the side to be connected can be partially dissolved by the chemical constituents of the polymer concrete, e.g., styrene, thus enabling a secure connection between seal and polymer concrete without additional adhesives. However, it is also conceivable for the seal, e.g., the foam rubber, to be fastened to the respective component, in particular the polymer concrete body, by means of one or more clamping rings according to the invention.

A use of a fastening element configured as a clamping element to connect at least two components for use in building construction, in particular light wells, or in civil engineering, in particular drainage devices, is also claimed within the scope of the application.

Furthermore, the use of the fastening element can alternatively or additionally have individual features or a combination of multiple features mentioned previously in reference to the composite element.

Figure 2:
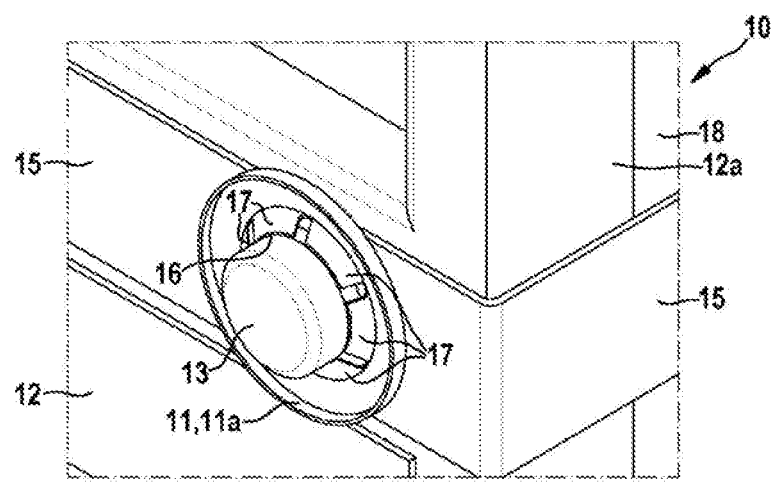

The invention will be explained in greater detail below with reference to the accompanying schematic drawings. The depicted embodiments merely represent examples of how the device according to the invention might be configured and do not constitute a firm restriction. In the drawings, FIG. 1 shows a perspective view of a composite element according to the invention with a sectional view of a fastening element according to a first exemplary embodiment;

FIG. 2 shows a perspective view of the composite element according to FIG. 1.

In the following description, the same reference numerals are used for the same and equivalent parts.

FIG. 1 shows a perspective view of a composite element 10 according to the invention with a sectional view of a fastening element 11 according to a first exemplary embodiment. The composite element 10 has two components and a fastening element 11. The first component comprises an end wall 12 of a drainage channel. The end wall 12 is formed in particular from polymer concrete. The end wall 12 has a cylindrical assembly pin 13. In other words, the assembly pin 13 is configured as a cylindrical protrusion on the end wall 12. The assembly pin 13 protrudes perpendicularly from the end wall 12.

The second component is configured as a steel bracket 15. The steel bracket 15 forms a kind of flat frame around the end wall 12. To connect the steel bracket 15 to the end wall 12, the steel bracket 15 has a recess that corresponds to the assembly pin 13 such that the bracket can be brought into full contact with the end wall 12. In other words, the steel bracket 15 abuts completely against the end wall 12.

To fix the steel bracket 15 to the end wall 12, the fastening element 11 is mounted on the assembly pin 13. The fastening element 11 is configured as a clamping disk 11a or as a clamping element. In particular, the fastening element 11 is configured as an axial clamping ring. The axial clamping ring has a central recess 16. The geometric shape of the central recess 16 corresponds to the geometric shape of the cylindrical assembly pin 13. For example, the central recess 16 has a round shape. The central recess 16 serves to receive the assembly pin 13.

The clamping disk 11a further has a plurality of clamping claws 17, for example. When mounted on the assembly pin 13, the clamping claws 17 are disposed at an angle to a plane of die clamping disk 11a. In other words, the clamping claws 17 protrude from the clamping disk 11a. When mounted, the clamping disk 11a or the clamping element is force-fittingly connected to the assembly pin 13. It is therefore not possible to detach the clamping disk 11a from the assembly pin 13 without destroying die clamping disk. The clamping disk 11a presses the steel bracket 15 against the end wall 12. The steel bracket 15 is therefore positioned between the clamping disk 11a and the end wall 12. The clamping disk 11a produces a secure and non-detachable connection between the steel bracket 15 and the end wall 12.

FIG. 2 shows a perspective view of the composite element 10 according to FIG. 1. The structure of the composite element 10 is similar to that of FIG. 1. In contrast to FIG. 1, an elastic material for a seal is applied to an opposite side 12a of the end wall 12. The elastic material is in particular foam rubber 18/EPDM foam. The foam rubber 18 is positioned between the opposite side 12a of the end wall 12 and the steel bracket 15. The foam rubber 18 is therefore fixed on the opposite side 12a of the end wall 12. In other words, the foam rubber 18, or the seal, forms a coating on the opposite side 12a of the end wall 12. The steel bracket 15 and the foam rubber 18 together ensure that the opposite side 12a of the end wall 12 can be connected to an adjoining drainage channel in a fluid-tight manner. An additional process of gluing the foam rubber 18 to the opposite side 12a of the end wall 12 can generally be dispensed with.

When the foam rubber 18 comes into contact with the polymer concrete on the opposite side 12a of the end wall 12, it can be partially dissolved on the surface of the opposite side 12a and bonded to the polymer concrete. This impedes a non-destructive separation of the foam rubber 18 from the opposite side 12a, and therefore, the foam rubber 18 is attached permanently to the opposite side 12a of the end wall 12.

The steel bracket 15 can further have latching elements at its ends, in particular latching hooks, which engage in corresponding recesses in a side wall of the drainage channel. The foam rubber 18 can thus be pressed onto or into the opposite side 12a of the end wall 12 in a fluid-tight manner.

It is also conceivable for the foam rubber 18 to be applied only in sections to areas that are to be sealed or in which foam rubber damping is required, e.g., to prevent rattling. Channel joints can also be sealed in this way. Advantageously, the foam rubber 18 can also be used to prevent undesirable relative slipping movements.

LIST OF REFERENCE NUMERALS 10 composite element
11 fastening element
11a clamping disk
12 end wall
12a opposite side
13 assembly pin
15 steel bracket
16 central recess
17 clamping claw
18 foam rubber

The invention claimed is:

1. A composite element (10) for use in construction, the composite element comprising
  at least two components comprising a first component and a second component, and
  at least one fastening element (11) for connecting the components,
  the first component comprises a drainage device having an end wall, and an assembly pin (13) extending outward from the end wall;
  the fastening element (11) is configured as a clamping disk (11a) having a central recess (16) for receiving and force the assembly pin (13), the fastening element (11) further has a plurality of clamping claws (17) mounted on the assembly pin (13) and protruding onto the assembly pin (13) at an angle to a plane of the clamping disk (11a), the clamping claws (17) protruding away from and not being in contact with the second component, and the second component is configured as a cover or frame for the drainage device and is positioned and secured between the end wall of the first component and the fastening element (11), wherein the clamping disk (11a) of the fastening element (11) is in contact with the second component.

2. The composite element according to any one of the preceding claims characterized in that a geometry of the fastening element (1 is adapted to an associated geometry of the assembly pin (13).

3. The composite element according to any one of the preceding claims characterized in that the first component includes a polymer concrete or concrete and the second component includes metal or plastic.

4. The composite element according to claim 1 characterized in that the end wall of the first component contacts the second component and the end wall of the first component is separated from the clamping disk of the fastening element (11) by the second component.

5. The composite element according to any one of the preceding claims characterized in that the first component is configured as a light well body and the second component is configured as a cover or frame for the light well.

6. The composite element according to any one of the preceding claims characterized in that the fastening element (11) can be integrated into at least one component.

7. The composite element according to any one of the preceding claims characterized in that the fastening element (11) is positioned on the components in such a way that a seal applied to the first component can be fixed.

* * * * *